(12) United States Patent
Tseng et al.

(10) Patent No.: US 11,994,734 B2
(45) Date of Patent: May 28, 2024

(54) PORT TRACER

(71) Applicants: ACSUPER TECHNOLOGIES INC., Miaoli County (TW); FIBERON TECHNOLOGIES, INC., Westborough, MA (US)

(72) Inventors: Chung-Ming Tseng, Miaoli County (TW); Kenichiro Nakamura, Kanagawa (JP)

(73) Assignees: ACSUPER TECHNOLOGIES INC., Miaoli County (TW); FIBERON TECHNOLOGIES, INC., Westborough, MA (US)

( * ) Notice: Subject to any disclaimer, the term of this patent is extended or adjusted under 35 U.S.C. 154(b) by 106 days.

(21) Appl. No.: 17/574,822

(22) Filed: Jan. 13, 2022

(65) Prior Publication Data

US 2023/0089427 A1    Mar. 23, 2023

(30) Foreign Application Priority Data

Sep. 17, 2021  (TW) .................................. 110134906

(51) Int. Cl.
*G02B 6/46* (2006.01)
*G02B 6/36* (2006.01)

(52) U.S. Cl.
CPC ........... *G02B 6/562* (2023.05); *G02B 6/3616* (2013.01)

(58) Field of Classification Search
CPC .............................. G02B 6/562; G02B 6/3616
See application file for complete search history.

(56) References Cited

U.S. PATENT DOCUMENTS

| 5,909,526 | A  | * | 6/1999  | Roth ..................... G02B 6/3825 385/56 |
| 8,314,603 | B2 |   | 11/2012 | Russell |
| 9,547,142 | B1 | * | 1/2017  | Chen ..................... G02B 6/4286 |
| 9,888,964 | B2 |   | 2/2018  | Hanley et al. |
| 10,133,010 | B2 |  | 11/2018 | Collier et al. |
| 2010/0129032 | A1 | * | 5/2010 | Riley ..................... G02B 6/3849 385/75 |
| 2010/0150504 | A1 | * | 6/2010 | Allen ..................... G02B 6/3825 385/100 |

(Continued)

FOREIGN PATENT DOCUMENTS

| CN | 113093345 A | 7/2021 |
| JP | 2020-063752 A | 4/2020 |

(Continued)

*Primary Examiner* — Sung H Pak
*Assistant Examiner* — Hoang Q Tran
(74) *Attorney, Agent, or Firm* — Rabin & Berdo, P.C.

(57) ABSTRACT

A port tracer including a housing, a light guiding tunnel, and a light guide cover. The housing has a first side and a second side opposite to each other and a third side connected to the first side and the second side. A first opening and a second opening are located on the first side and the second side respectively. The light guiding tunnel is disposed inside the housing. The light guiding tunnel has a first light entrance-exit and a second entrance-exit that face the first side and the second side respectively. The light guide cover is detachably connected to the first opening. The light guide cover covers the first light entrance-exit. The third side has a third opening. A part of the light guide cover is located inside the housing and opposite to the third opening.

10 Claims, 5 Drawing Sheets

(56) References Cited

U.S. PATENT DOCUMENTS

| | | | | |
|---|---|---|---|---|
| 2018/0172923 A1* | 6/2018 | Bauco | ............... | G02B 6/3855 |
| 2019/0346630 A1* | 11/2019 | Yang | ............... | G02B 6/3849 |
| 2021/0325613 A1* | 10/2021 | Higley | ............... | G02B 6/3897 |

FOREIGN PATENT DOCUMENTS

| | | |
|---|---|---|
| KR | 20110099036 A | 9/2011 |
| TW | I662754 B | 6/2019 |
| TW | M581206 U | 7/2019 |
| WO | 2016160255 A1 | 10/2016 |

* cited by examiner

PORT TRACER

CROSS-REFERENCE TO RELATED APPLICATION

This application claims priority to Taiwan Application Ser. No. 110134906, filed Sep. 17, 2021, which is herein incorporated by reference in its entirety.

BACKGROUND

Field of Invention

The present disclosure relates to a port tracer.

Description of Related Art

Optical fibers are used as different transmission medium nowadays. Optical fibers can improve the speed of transmission and lower the distortion rate comparing to general coaxial lines. Optical fibers have different length corresponds to its transmission distance. When equipment has multiple optical fibers, finding two ends of one optical fiber to perform fiber examination may be time consuming. Port tracers for finding the corresponded location of light from the optical fibers are often installed on the two ends of the optical fiber to enhance the speed of performing fiber examinations.

Generally, the conventional port tracers are used to achieve the light tracing effect by providing an input light to the port tracer on one end of the optical fiber and receiving the light from the port tracer on the other end of the optical fiber. However, the port tracer that is lit up by the light sometimes are not obvious, thus the time for users to find the corresponded location of the optical fibers is increased.

Therefore, how to provide a port tracer to solve the above problems is a main target for the industries.

SUMMARY

In such view, one of the purposes of the present disclosure is to provide a port tracer to solve the above problems effectively.

The present disclosure relates to a port tracer including a housing, a light guiding tunnel, and a light guide cover. The housing has a first side and a second side opposite to each other and a third side connected to the first side and the second side. A first opening and a second opening are located on the first side and the second side respectively. The light guiding tunnel is disposed inside the housing. The light guiding tunnel has a first light entrance-exit and a second entrance-exit that face the first side and the second side respectively. The light guide cover is detachably connected to the first opening. The light guide cover covers the first light entrance-exit.

In some embodiments of the present disclosure, the light guide cover includes an embedded portion. The embedded portion is embedded in the first light entrance-exit and extends along an inner wall of the light guiding tunnel.

In some embodiments of the present disclosure, the housing further includes a groove. The groove is formed by recessing from the second opening, and the groove surrounds the second light entrance-exit.

In some embodiments of the present disclosure, the housing further includes a fourth side connected to the first side and the second side. The port tracer further includes a cable fitting portion disposed on the fourth side.

In some embodiments of the present disclosure, the cable fitting portion has a first cable exit and a second cable exit opposite to each other. The first cable exit and the second exit are located on the first side and the second side respectively.

In some embodiments of the present disclosure, the light guide cover partially covers the first opening and exposes the first cable exit.

In some embodiments of the present disclosure, the cable fitting portion has a fitting opening extending to the first cable exit and the second cable exit.

In some embodiments of the present disclosure, the cable fitting portion has two elastic arms. The fitting opening is formed between the two elastic arms.

In some embodiments of the present disclosure, the light guide cover and an edge of the first opening are flipably connected. The light guide cover has a plurality of latches. The latches are engaged to at least one inner surface of the housing.

In some embodiments of the present disclosure, the third side has a third opening. A part of the light guide cover is located inside the housing and opposite to the third opening.

In summary, in the port tracer of the present disclosure, the third opening that is located on the third side of the housing increase the light output range of the light guide cover, which helps users to determine the corresponded locations of two ends of the optical fiber during tracing the two ends, so as to reduce the time of operations for users. On the other hand, the users can achieve the purpose of determining whether the optical fiber is damaged by installing a light source (e.g. using a ceramic ferrule for optical fibers) on the first light entrance-exit and providing an input light through the port tracer to the optical fiber. In addition, the users can prevent the ends of the optical fiber from being contaminated with dust or being defaced by installing the port tracer on the ends of the optical fiber, so as to extend the life of optical fiber and guarantee the efficacy of the optical fiber.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
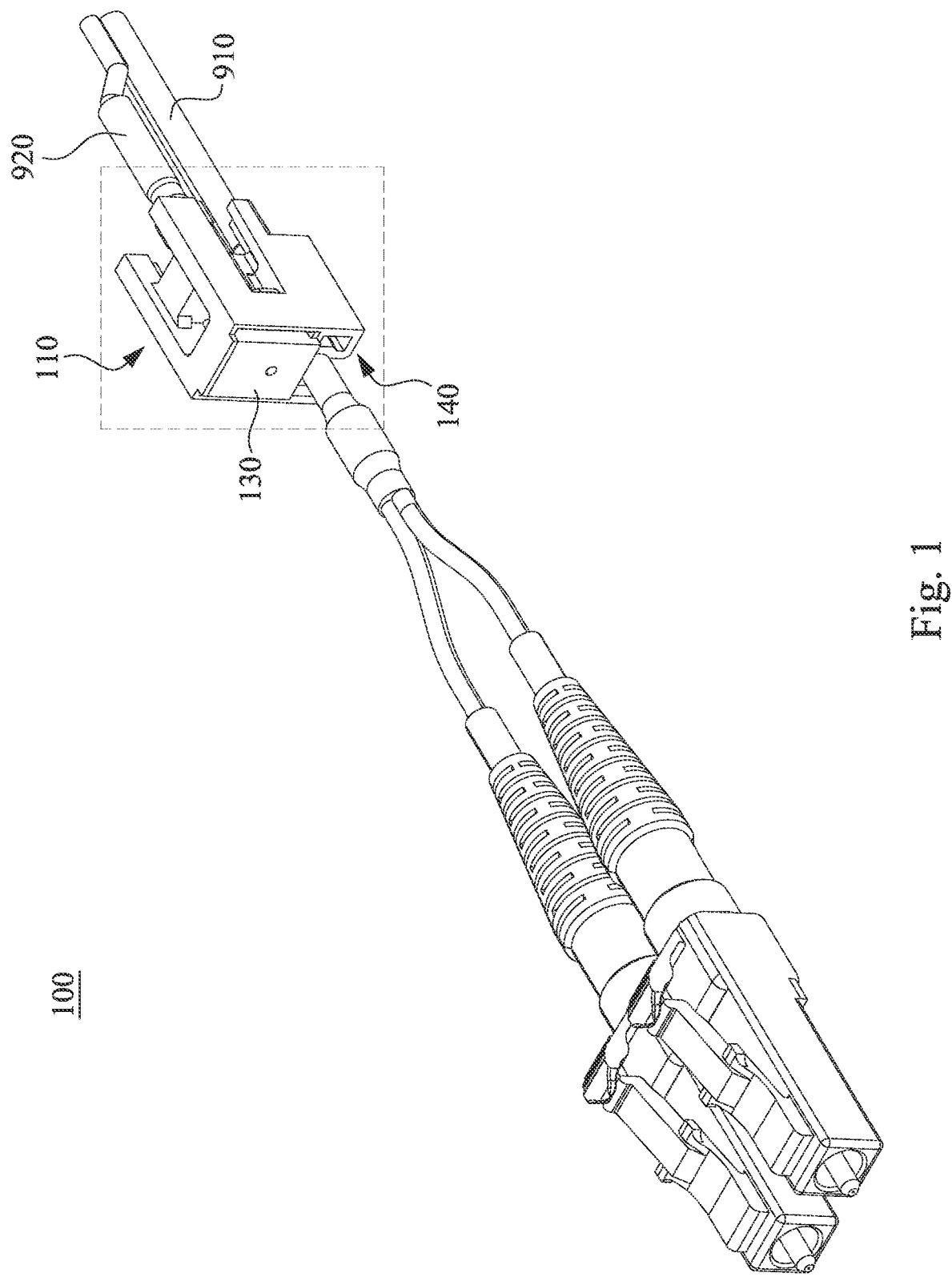
FIG. 1 is a schematic diagram of an application of a port tracer according to one embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a schematic diagram of an application of a port tracer 100 according to one embodiment of the present disclosure. Reference is made to FIG. 1. When a port tracer 100 is used for tracing the two corresponding ends of one optical fiber, whether the two ends correspond to each other can be determined by installing the port tracer 100 on an end of the optical fiber and providing an input light form the other end of the optical fiber. Specifically, the optical fiber illustrated in FIG. 1 includes a transmission optical fiber 910 and a tracing optical fiber 920. The transmission optical fiber 910 is used to transmit data. The tracing optical fiber 920 is used to install the port tracer 100 to trace the ends of optical fibers. After installing the port tracer 100 on one of the ends of the tracing optical fiber 920, a user can provide an incident light from another end of the tracing optical fiber 920. the user can find the end of the tracing optical fiber 920 that is installed with the port tracer 100 by observing whether the port tracer 100 is lit up by the incident light or not. The light source of the incident light can be a flashlight light source or a laser light source. The structure of the port tracer 100 will be discussed in the following descriptions.

Figure 2:
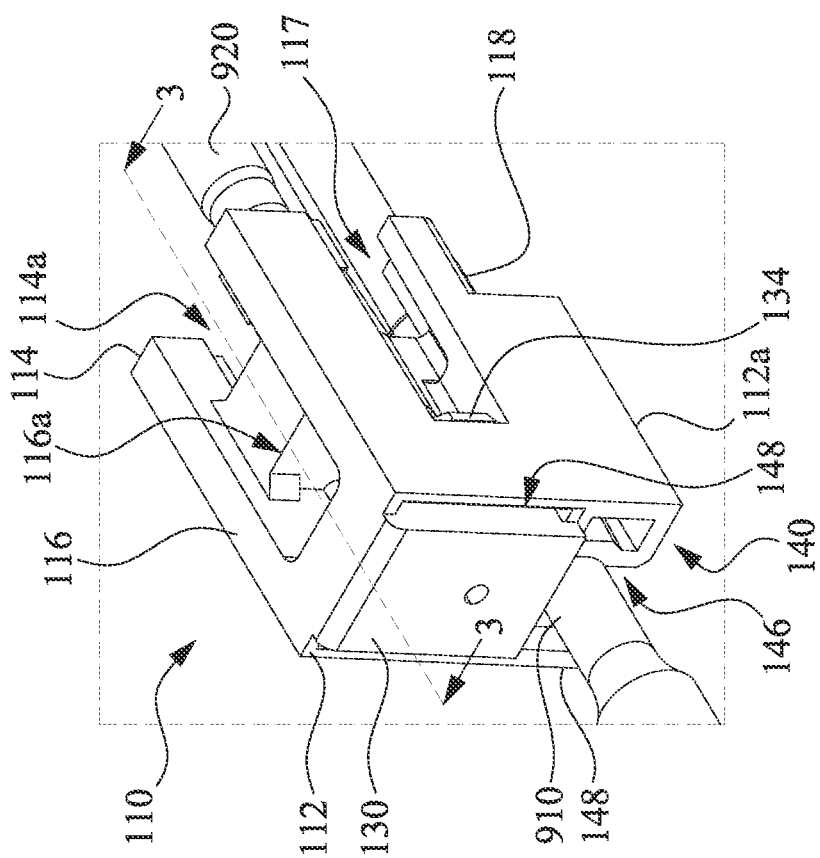
FIG. 2 is a schematic diagram of the port tracer in FIG. 1.
Figure 3:
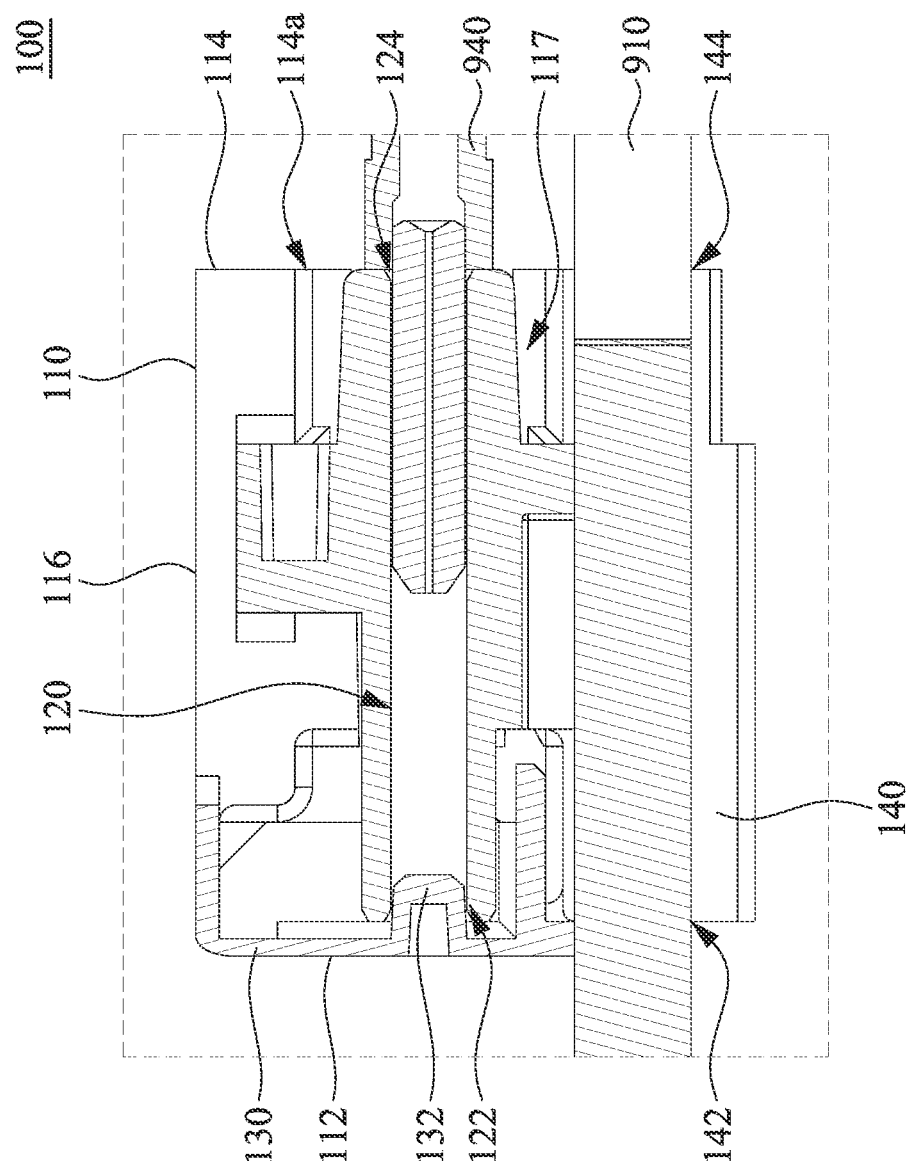
FIG. 3 is a cross-sectional view of the port tracer in FIG. 2 taken along line

FIG. 2 is a schematic diagram of the port tracer 100 in FIG. 1. FIG. 3 is a cross-sectional view of the port tracer 100 in FIG. 2 taken along line 3-3. References are made to FIG. 2 and FIG. 3. The port tracer 100 includes a housing 110, a light guiding tunnel 120, and a light guide cover 130. The housing 110 has a first side 112 and a second side 114 opposite to each other and a third side 116 connected to the first side 112 and the second side 114. A first opening 112a and a second opening 114a are located on the first side112 and the second side 114 respectively. The light guiding tunnel 120 is disposed inside the housing 110. The light guiding tunnel 120 has a first light entrance-exit 122 and a second light entrance-exit 124 that face the first side 112 and the second side 114 respectively. The light guide cover 130 is detachably connected to the first opening 112a. The light guide cover 130 covers the first light entrance-exit 122. The third side 116 has a third opening 116a. A part of the light guide cover 130 is located inside the housing 110 and opposite to the third opening 116a.

In the embodiment illustrated in FIG. 2, the housing 110 of the port tracer 100 is a rough cuboid, but the present disclosure is not limited to this. In some embodiments, the cross section of the first opening 112a on the first side 112 is rectangle, but the present disclosure is not limited to this. Specifically, the appearances of the housing 110 and the first opening 112a are not limited in specific shapes. The appearance of the port tracer 100 is utilized to accommodate the light guiding tunnel 120 inside the housing 110. On the other hand, the housing 110 can provide better connection to external ports. For example, the stability of the ports of the port tracer 100 for connecting the external ports can be improved. Any appearance of the housing 110 and any shape of the first opening 112a can be utilized as they satisfy the aforementioned purposes. As shown in FIG. 2, the third opening 116a of the third side 116 may partially run through the third side 116 of the housing 110. Specifically, in FIG. 2, the third opening 116a which has a rectangle cross section runs through the end of the third side 116 that is adjacent to the light guide cover 130. The purpose of the third opening 116a is to increase the light output range of the light guide cover 130, and the shape of the third opening 116a is not limited to be rectangle.

Please refer to FIG. 2 and FIG. 3. In some embodiments, the housing 110 further includes a groove 117. The groove 117 is formed by recessing from the second opening 114a, and the groove 117 surrounds the second light entrance-exit 124. For example, in the embodiment illustrated in the figures, the groove 117 is substantially a cubic-shape groove, and a part of the light guiding tunnel 120 and the second light entrance-exit 124 are extended from the groove 117 to the second side 114 of the housing 110. The purpose of the groove 117 is to stabilize the connection between the second light entrance-exit 124 and an external port 930 (e.g., an optical fiber port). Therefore, the shape of the groove 117 can correspond to the appearance of the external port 930 and be replaced by any suitable shape, and is not limited to be a cubic-shape groove.

Please refer to FIG. 3. The light guiding tunnel 120 is disposed in the interior of the housing 110. The first light entrance-exit 122 and the second light entrance-exit 124 of the light guiding tunnel 120 are connected to the first side 112 and the second side 114 of the port tracer 100 respectively. In some embodiments, the sizes of the apertures of the first light entrance-exit 122 and the second light entrance-exit 124 may be different. The sizes of the apertures may be changed according to the shapes and sizes of the external ports that will be connected to the light guiding tunnel 120. For example, the first light entrance-exit 122 and the second light entrance-exit 124 have corresponding shapes with a ceramic ferrule 940 of an optical fiber port. In this embodiment, the light guide cover 130 includes an embedded portion 132. The embedded portion 132 is embedded in the first light entrance-exit 122 and extends along an inner wall of the light guiding tunnel 120. The purpose of the embedded portion 132 is to increase the light receiving area of the light guide cover 130, and the embedded portion 132 can ensure the light guide cover 130 fully covers the first light entrance-exit 122. In such way, the light will not leak outside of the light guiding tunnel 120 from the first light entrance-exit 122.

Please refer to FIG. 2 and FIG. 3. In some embodiments, the housing 110 further includes a fourth side 118 connected to the first side 112 and the second side 114. The port tracer 100 further includes a cable fitting portion 140 disposed on the fourth side 118. The purpose of the cable fitting portion 140 is to fix the port tracer 100 on a cable, so as to improve the stability between the port tracer 100 and the external port 930. Specifically, taking the biaxial optical cable described above as an example (e.g., the transmission optical fiber 910 and the tracing optical fiber 920), the port tracer 100 that connects with the tracing optical fiber 920 can be fixed on the transmission optical fiber 910 through the cable fitting portion 140, so as to further improve the stability of the port tracer 100 to avoid falling off during use.

Figure 4:
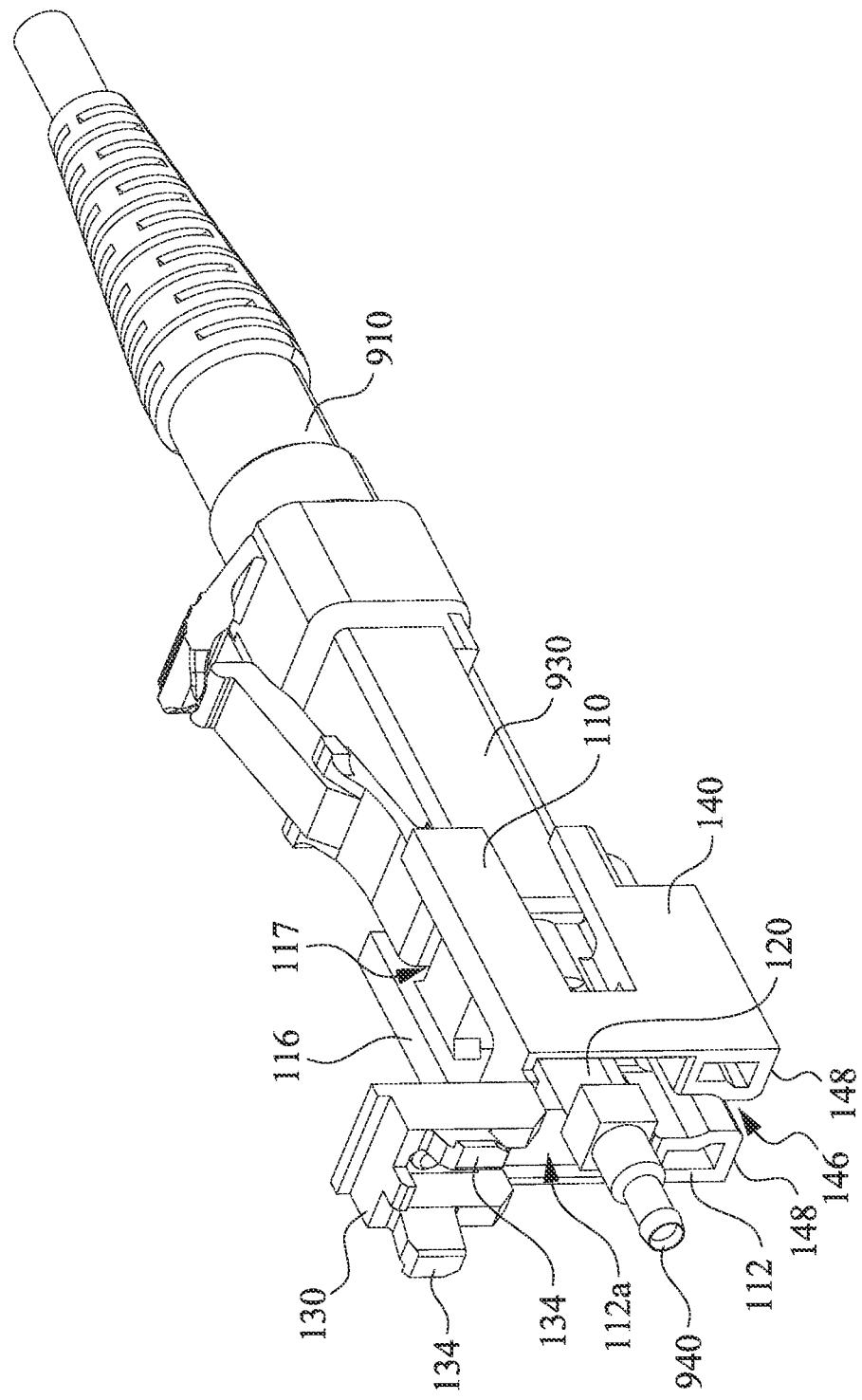
FIG. 4 is a schematic diagram of another application of a port tracer according to one embodiment of the present disclosure.

FIG. 4 is a schematic diagram of another application of a port tracer 100 according to one embodiment of the present disclosure. The port tracer 100 in the present disclosure also can be a port for providing incident light to inspect whether the transmission optical fiber 910 is damaged. Please refer to FIG. 4. The user can connect the second side 114 of the housing 110 with the external port 930 (e.g. an optical fiber port), and the groove 117 accommodates and fixes a part of the external port 930 during the connection. Afterwards, the light guide cover 130 located on the first side 112 is removed from the first opening 112a to expose the first light entrance-exit 122 of the light guiding tunnel 120. The user can install an input light source (e.g., the ceramic ferrule 940 of the optical fiber in FIG. 4) in the first light entrance-exit 122 and emit light into the transmission optical fiber 910 to achieve the purpose of inspecting whether the transmission optical fiber 910 is damaged.

Please refer to FIG. 2 and FIG. 4. The cable fitting portion 140 has a first cable exit 142 and a second cable exit 144 opposite to each other. The first cable exit 142 and the second cable exit 144 are located on the first side 112 and the second side 114 respectively. In some embodiments, the cable fitting portion 140 has a fitting opening 146 extending to the first cable exit 142 and the second cable exit 144. When a cable passes through the first cable exit 142 and the second cable exit 144, the fitting opening 146 accommodates a part of the cable between the first cable exit 142 and the second cable exit 144.

The cable can pass through the first cable exit 142 and the second cable exit 144 to be accommodated inside the fitting opening 146. The purpose of the fitting opening 146 is to improve the contact area between the cable and the port tracer 100, so as to improve the stability of fixing. Therefore, the shape of the fitting opening 146 may be replaced to the shape of the cable correspondingly.

Please refer to FIG. 2. The light guide cover 130 partially covers the first opening 112a and exposes the first cable exit 142. Specifically, in some embodiments, the first cable exit 142 is connected to the first opening 112a, and the second cable exit 144 is connected to the second opening 114a, but the present disclosure is not limited to this. By connecting the first cable exit 142 and the second cable exit 144 to the first opening 112a and the second opening 114a respectively, the original purposes can be kept and the manufacturing cost of the port tracer 100 can be reduced at the same time.

In another embodiment, the cable fitting portion 140 has two elastic arms 148. The fitting opening 146 is formed between the two elastic arms 148, but the present disclosure is not limited to this. Specifically, please refer to FIG. 4, the two elastic arms 148 extend along two edges of the fourth side 118 that are opposite to each other. An opened fitting opening 146 is formed between the two elastic arms 148. The fitting opening 146 connects the first cable exit 142 and the second cable exit 144. The cable can pass through the opened fitting opening 146 and be accommodated directly. The two elastic arms 148 can hold the cable at the fitting opening 146 to prevent the cable from falling off.

Please refer to FIG. 4. In some embodiments, the light guide cover 130 has an elastic material. Specifically, the light guide cover 130 and an edge of the first opening 112a are flipably connected. Therefore, the light guide cover 130 can be removed from the first opening 112a, and flex along an connection edge between the light guide cover 130 and the first opening 112a. In some embodiments, the light guide cover 130 has a plurality of latches 134. The latches 134 are engaged to at least one inner surface of the housing 110. Specifically, the latches 134 can be engaged with any part of the inner surface of the first side 112 and the second side 114 of the housing 110. The number of the latches 134 illustrated in FIG. 4 is two. However, the number of the latches is not limited. The purpose of the latches 134 is to fix the light guide cover 130 better in the first opening 112a and ensure that the light guide cover 130 will not detach during using the port tracer 100.

Figure 5:
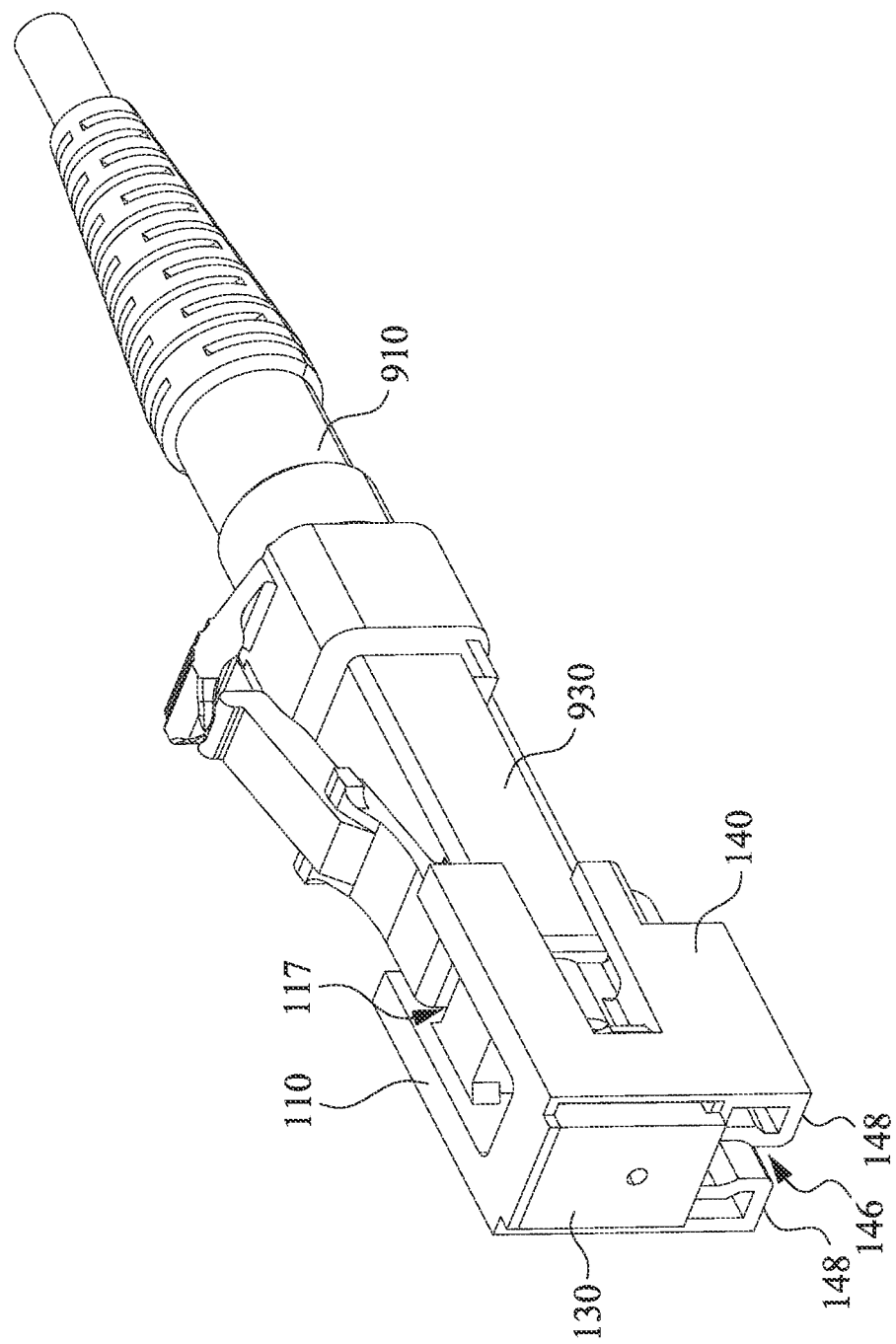
FIG. 5 is a schematic diagram of another application of a port tracer according to one embodiment of the present disclosure.

FIG. 5 is a schematic diagram of another application of a port tracer 100 according to one embodiment of the present disclosure. Please refer to FIG. 5, when the light guide cover 130 covers the first opening 112a, the port tracer 100 can be used as a dust cover. The port tracer 100 can prevent the port of the optical fiber from being contaminated with dust or being defaced, so as to extend the life of optical fibers and guarantee the efficacy of the optical fibers.

According to the embodiments of the present disclosure, it can be clearly seen that, in the port tracer of the present disclosure, the third opening that is located on the third side of the housing increase the light output range of the light guide cover, which helps users to determine the corresponded locations of two ends of the optical fiber during tracing the two ends, so as to reduce the time of operations for users. On the other hand, the users can achieve the purpose of determining whether the optical fiber is damaged by installing a light source (e.g. using a ceramic ferrule for optical fibers) on the first light entrance-exit and providing an input light through the port tracer to the optical fiber. In addition, the users can prevent the ends of the optical fiber from being contaminated with dust or being defaced by installing the port tracer on the ends of the optical fiber, so as to extend the life of optical fiber and guarantee the efficacy of the optical fiber.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A port tracer, comprising:
   a housing having a first side and a second side opposite to each other and a third side connected to the first side and the second side, wherein a first opening, a second opening, and a third opening are located on the first side, the second side, and the third side respectively;
   a light guiding tunnel disposed inside the housing and having a first light entrance-exit and a second light entrance-exit that face the first side and the second side respectively,
   wherein
      the light guiding tunnel spans from the first opening across the third opening to the second opening,
      the first light entrance-exit is smaller than the first opening, and
      the second light entrance-exit is smaller than the second opening; and
   a light guide cover detachably connected to the first opening and covering the first light entrance-exit, wherein
   the light guide cover and the housing are so configured that the light guide cover receives a light from the light guiding tunnel and outputs a portion of the light through the third opening of the housing.

2. The port tracer of claim 1, wherein
   the light guide cover and an edge of the first opening are flipably connected, and
   the light guide cover further comprises an embedded portion, wherein
      the embedded portion is disposed away from the edge of the first opening, and
      the embedded portion is configured to be embedded in the first light entrance-exit and to extend along an inner wall of the light guiding tunnel to cover the first light entrance-exit.

3. The port tracer of claim 1, wherein the housing further comprises a groove, the groove is formed by recessing from the second opening, and the groove surrounds the second light entrance-exit.

4. The port tracer of claim 1, wherein the housing further comprises a fourth side connected to the first side and the second side, and the port tracer further comprises a cable fitting portion disposed on the fourth side.

5. The port tracer of claim 4, wherein the cable fitting portion has a first cable exit and a second cable exit opposite to each other, and the first cable exit and the second cable exit are located on the first side and the second side respectively.

6. The port tracer of claim 5, wherein the light guide cover partially covers the first opening and exposes the first cable exit.

7. The port tracer of claim 6, wherein the cable fitting portion has a fitting opening extending to the first cable exit and the second cable exit.

8. The port tracer of claim 7, wherein the cable fitting portion further has two elastic arms, and the fitting opening is formed between the two elastic arms.

9. The port tracer of claim 1, wherein the light guide cover and an edge of the first opening are flipably connected, the light guide cover has a plurality of latches, and the latches are engaged to at least one inner surface of the housing.

10. The port tracer of claim 1, wherein
a part of the light guide cover is located inside the housing and opposite to the third opening.

* * * * *